Aug. 24, 1965
C. SCHLABS
3,202,220
EARTHWORKING PROCESS
Original Filed March 8, 1963
2 Sheets-Sheet 1
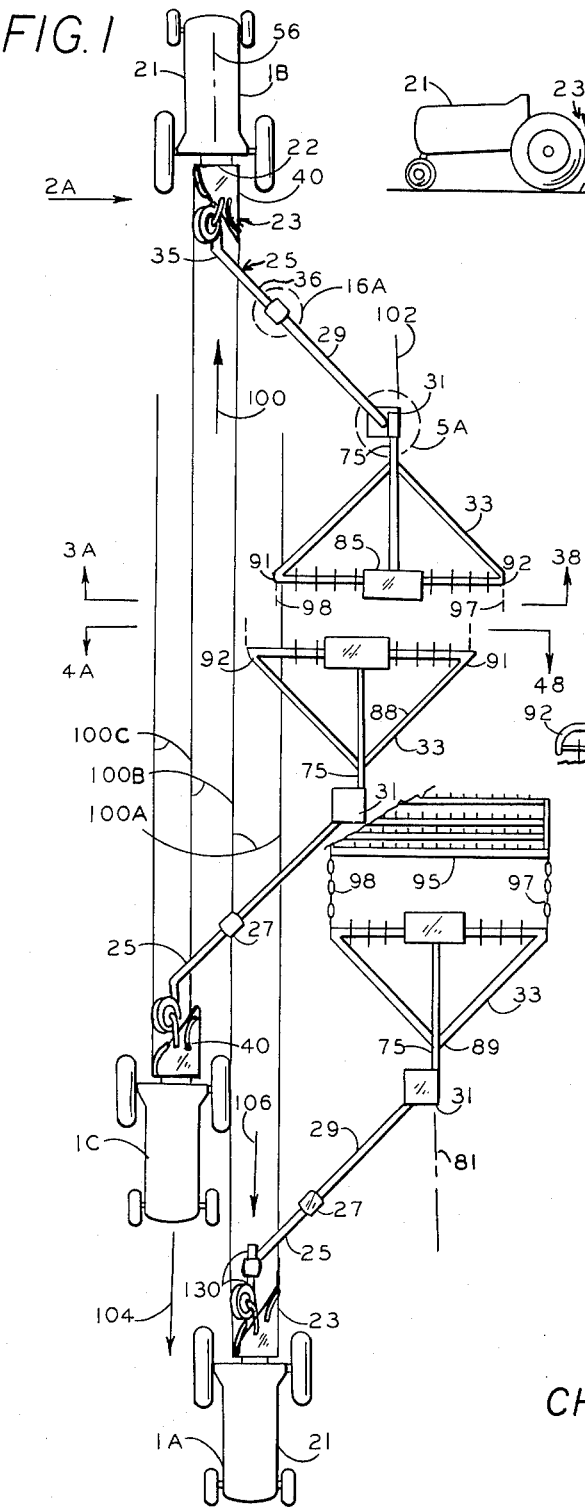
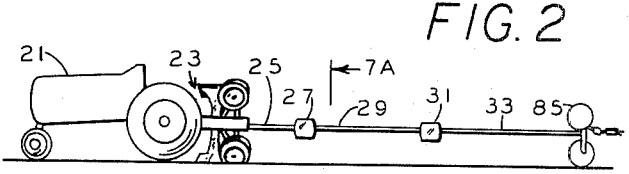
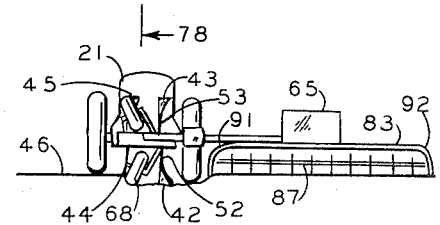
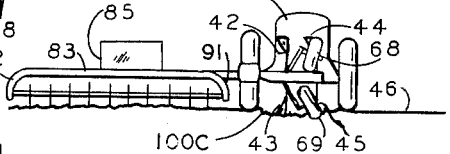
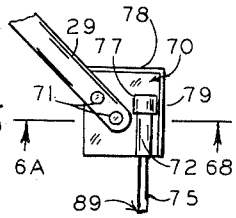
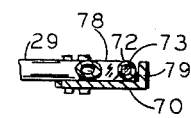
INVENTOR.
CHARLES SCHLABS
BY
Ely Silverman
ATTORNEY Aug. 24, 1965     C. SCHLABS     3,202,220
EARTHWORKING PROCESS
Original Filed March 8, 1963
2 Sheets-Sheet 2
FIG.7     FIG.10     FIG.13
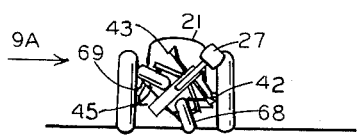 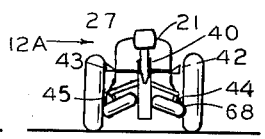 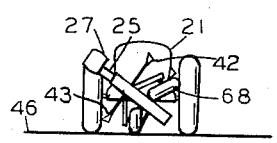
FIG.8     FIG.11     FIG.14
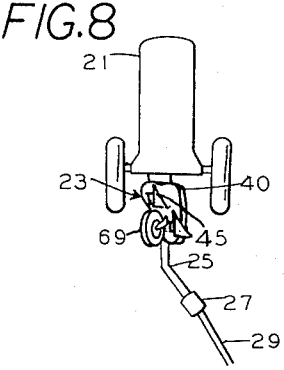 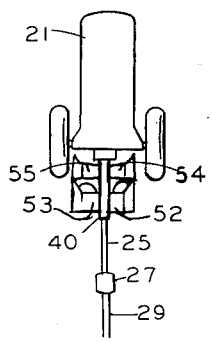 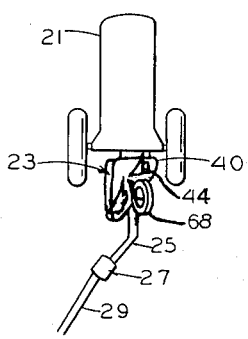
FIG.9     FIG.12
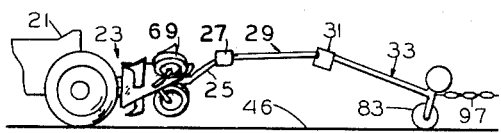 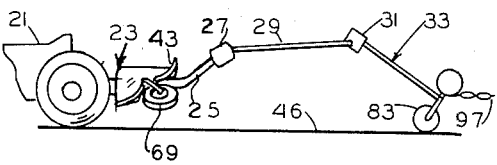
FIG.15     FIG.16
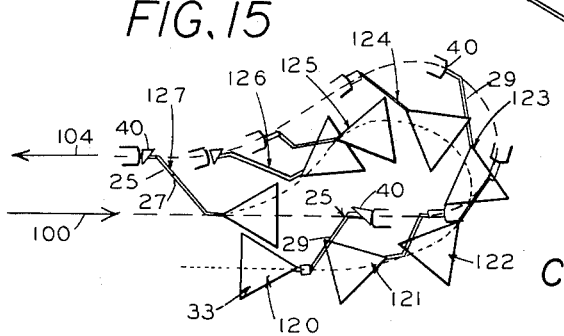
INVENTOR.
CHARLES SCHLABS
BY
*Ely Silverman*
ATTORNEY

United States Patent Office

3,202,220
Patented Aug. 24, 1965

3,202,220
EARTHWORKING PROCESS
Charles Schlabs, Rte. 2, Hereford, Tex.
Original application Mar. 8, 1963, Ser. No. 264,000.
Divided and this application Apr. 21, 1964, Ser.
No. 361,437
1 Claim. (Cl. 172—1)

This invention relates to an improvement in an earthworking process using alternating implements. More particularly, this invention relates to an improvement in the use of two-way plows and other assemblies used concurrently therewith. This application is a division of my co-pending application Serial No. 264,000 filed March 8, 1963 issued as Patent No. 3,183,981.

In preparing seed beds for planting theoretically the mouldboard plow cuts the soil loose from the furrow and shatters and inverts the furrow slice and thereby opens the earth for infiltration of water and aeration. Generally, where there are crop residues they are cut up and removed. However, sod crops are usually plowed under without cutting or removing. The plowing of soil with sod crops thereon thus produces firm clods and some pulverized soil. The amount of pulverization and furrowing produced by plowing generally depends on the mouldboard steepness, the soil properties, and the path of the soil on the mouldboard during the operation of the plow. The path of the soil on the mouldboard in turn depends on the speed of plowing the stiffness and friability of the soil. Accordingly, the product of the plowing operation—especially with the varied bulk densities of the clods produced by plowing land with sod crop thereon—requires further treatment, such as harrowing, to make an evenly divided and pulverized seed bed.

According to the process of this invention, plowing and harrowing in one operation is made convenient, efficient, and economical using a conventional two-way plow. This avoids the differential effects of rain and sun on clods and on soft residues produced by conventional plowing operations during the usual interval between stages in seedbed preparation as well as avoiding separate time-consuming field operations that are not only expensive but also require handling of earth-working implements over plowed and harrowed land, which produces undesirable and unevenly distributed compaction. According to the apparatus and arrangement of this invention, the large clods of uneven bulk density produced by the plowing are further broken up in predetermined controllable and even fashion.

Further, the procedure provided by the apparatus of this invention provides for a minimum pulverization during the plowing operation, hence, a minimum power draft and a minimum time consumption for such step. This invention alos provides a procedure and apparatus that produces a seedbed of controllable and predetermined desired looseness and density with a minimum of effect by undesirable variable factors.

Accordingly, one object of this invention is to provide means whereby a drawn earthworking implement disposed behind a rotatable two-way plow may be articulated thereto in response to rotatable motion of that plow.

Another object of this invention is to provide a process and apparatus for synergistic cooperation of a two-way plow and a harrow associated therewith for operation thereof in a pattern providing efficient seedbed treatment.

Another object of this invention is to provide orientation and control means which permanently and reliably fix the position of a drawn earth-treating implement relative to a rotatable plow during operation, which means are simple in construction and reliable in operation.

Yet another object of this invention is to provide connections between a two-way plow and complementary earth-treating implements to permit such complementary implements to remain on the ground as they are laterally translated.

Yet another object of this invention is to provide a harrow means in cooperative articulation with a two-way plow.

Other objects of this invention will be apparent to those skilled in the art on study of the below description of which description the accompanying figures form a part and in all of which figures the same numerals refer to the same parts throughout and wherein:

FIGURE 1 is a top plan view showing the components forming the combination of apparatus of this invention in various positions during the procedure and pattern of earth treatment accomplished thereby;

FIGURE 2 is a side view of the combination of apparatus of this invention as seen along the direction of the arrow 2A of FIGURE 1;

FIGURE 3 is a rear view of the apparatus combination shown in FIGURE 1 of this invention as viewed along the plane 3A–3B of FIGURE 1;

FIGURE 4 is a rear view of the apparatus in position 1A in the operation shown in FIGURE 1 showing the combination of apparatus of this invention operating with the harrow to the left-hand side of the tractor as viewed along plane 4A–4B of FIGURE 1;

FIGURE 5 is an enlarged top view of the joint 31 in the zone 5A of FIGURE 1;

FIGURE 6 is a cross-sectional view along plane 6A–6B of FIGURE 5;

FIGURE 7 is a rear view of the apparatus of FIGURE 1 as viewed along the plane 7A–7B of FIGURE 2 during an initial phase of counterclockwise rotation of the boom 25 and related rotatable parts;

FIGURE 8 is a top view of the apparatus positioned as in FIGURE 7;

FIGURE 9 is a side view of the apparatus of FIGURE 1 in the position of its component parts shown in FIGURE 7 as seen along the arrow 9A of FIGURE 7;

FIGURE 10 is a rear view of the apparatus of FIGURE 1 viewed as in FIGURE 7 but in a more advanced counterclockwise position of the boom 25 and related rotatable parts than shown in FIGURE 7;

FIGURE 11 is a top view of the apparatus positioned as shown in FIGURE 10;

FIGURE 12 is a side view of the apparatus of FIGURE 1 in the orientation of its component parts as shown in FIGURE 10 and as seen along the direction of the arrow 12A of FIGURE 10;

FIGURE 13 is a rear view of the component parts of the apparatus of FIGURE 1 viewed as in FIGURE 7 and showing the component parts thereof in a stage of rotation in a counterclockwise direction more advanced than that shown in FIGURE 10;

FIGURE 14 is a top view of the apparatus positioned as shown in FIGURE 13;

FIGURE 15 diagrammatically shows the paths of the plow and harrow subassemblies during a turn wherein the direction of the travel of the plow is reversed and the harrow subassembly is moved from the right to the left side of the plow subassembly according to the process and apparatus of this invention; and FIGURE 16 is a perspective view of the joint 27 in zone 16A of FIGURE 1.

Generally, the over-all combination of the apparatus of this invention comprises, in operative combination, a tractor 21, an earthworking implement subassembly 23 adapted for alternate left and right-hand operation, a boom 25, a universal joint 27, a link arm 29, a rotatable joint and a second earthworking implement subassembly 33.

In the particular preferred embodiment of this invention, the tractor 21 is a conventional 50 H.P. tractor. The subassembly 23 is a two-way plow such as shown in U.S. Patents 2,239,596, 2,708,396, or 2,543,786 having an axis of rotation parallel to the longitudinal axis of the tractor 21.

The boom 25 is a rigid elongated member which is permanently fixed to the rotatable plow subassembly with the length of the boom disposed at an acute angle to the axis of rotation of the plow subassembly. The point of permanent fixing of the boom to the plow also supports the boom so that no further ground contact is required by this member, i.e. no separate ground contacting support member is required by this boom. A universal joint 27 is located at the distal end 36 of the boom 25. The link element is an eight-foot long 3″ O.D. steel tube. The boom is a 3″ square beam 2 feet long. The link joint 27 between the boom 25 and the link 29 is a conventional universal joint. A second joint 31 joins the link 29 to the second ground-working implement 33 which is, in the preferred embodiment, a harrow.

The tractor 21 supports on its tool bar 22 a two-way rotatable plow subassembly 23. The rotatable platform 40 of the plow subassembly 23 is, in the preferred embodiment, provided on its lower (as seen in FIGURES 3 and 7) side with two mouldboard plows 42 and 44 firmly mounted onto that rotatable platform for cutting and inverting the soil as 46 and throwing it to the right as shown in FIGURE 3. On the upper surface of the platform (as seen in FIGURES 3 and 7) a pair of mouldboard plows 43 and 45 are similarly mounted to provide for throwing the soil as 46 to the left as shown in FIGURE 4.

The plows as 42 and 44 are mounted on the platform 46 by standards therefor as 52 and 54, respectively; similarly the plows 43 and 45 are mounted on standards 53 and 55.

The path of travel of the tractor as 100 is parallel to the longitudinal axis 56 of the tractor 21 and the longitudinal axis of the tractor 21 passes through the center line of the tractor and also between the standards as 52 and 54 for the plows to a plane equidistant from each of those standards. The standards 52 and 53 are coplanar and colinear with each other on opposite sides of the platform 40 as are the longitudinal axes of the standards 54 and 55.

The boom 25 is a rigid elongated member which is permanently fixed to the rotatable plow subassembly with the length of the boom disposed at an acute angle to the axis of rotation of the plow subassembly. The proximal end 35 of the boom 25 is fixed to the platform 40 and supports the boom so that no separate ground-contacting support member is required by this boom.

During operation, as shown in positions 1A, 1B and 1C of FIGURE 1, the boom 25 is located with its longitudinal axis in the horizontal plane and at an angle of 45° to the longitudinal axis 56 of the tractor. In the preferred embodiment, the boom 25 is a 3″ square steel beam 2 feet long.

A universal joint is located at the distal end 36 of the boom 25. The joint 31 rotatably joins the link arm 29 to the second ground-working implement 33 which is, in the preferred embodiment, a harrow.

The joint subassembly 27 comprises a proximal U-shaped yoke 60, a link element 61 and a distal U-shaped yoke 62. The yoke 62 is firmly welded and attached to the link arm 29. A vertical (in operative position shown in FIGURE 1) pivot pin 64 joins the inner or proximal end of link 61 and the horizontal arms of the proximal yoke 60. A second, horizontal, pivot pin 65 at right angles to pin 64 joins the vertical arms of yoke 62 with the outer end of link 61. Proximal yoke 60 is firmly joined to the distal end of arm 25, as by welding.

The link arm 29 is an 8-foot long 3″ O.D. steel tubing of ½″ wall thickness in the preferred embodiment. The inner or proximal end thereof is firmly joined to the yoke 62; the outer or distal end thereof is joined firmly to the second joint 31.

Joint 31 comprises a juncture plate, 70, to which the arm 29 is firmly attached as by bolts 71. A collar 72 provided with a cylindrical passageway, 73, therethrough is firmly attached to plate 70. The drawbar 75 of the harrow 33 firmly and smoothly and rotatably fits in collar 72. A locking bolthead 77 holds the drawbar arm 75 firmly yet rotatably in place within the collar 72. In the preferred embodiment the plate 70 is formed of ½″ steel plate and is 10″ square and has a 1½″ ribbing flange 79 along one edge and a ribbed flange 78 along the other. The plate is made of ½″ steel. The collar 72 is formed of 6″ long 2″ internal diameter ½″ steel wall tubing for holding the drawbar of the harrow 33. The smooth fit of the collar 72 about the drawbar 75 provides a fixed angular relationship between the longitudinal axis of the arm 29 and the central longitudinal axis 81 of the harrow 33.

The subassembly 33 comprises in the preferred embodiment a spiral harrow which contacts and works the earth. It provides 13 spirals extending across 7 feet of frame 83, which frame is 8½ feet wide. The spiral of the harrow has an outside diameter of 15″. A water tank or reservoir 85 is firmly attached to the top of the rear frame 83 to supply sufficient weight as desired on the frame to press the blades of the harrow into the ground. The spirals are fixed at each 180° interval to a rotatable central shaft 87 about which the spirals rotate. The frame 83 is U-shaped and rotatably supports the central shaft in bearings at its lateral ends. A V-shaped front frame 88 passes from the front end 89 of the drawbar 75 and is firmly attached to the lateral ends 91 and 92 of the frame 83. In the preferred embodiment the frame 83 is made of 3″ O.D. steel tubing. The drawbar 75 is firmly welded to the center of the frames 83 and 88.

A spring harrow 95 of 8-foot width is drawn by chains 97 and 98 attached to the upper portions of the ends 91 and 92 of the frame 83.

By this invention the harrow 33 is, as shown in FIGURE 1 at position 1B, drawn forward in the general forward direction 100 of travel of the tractor; the tension in the arm 29 provides for maintaining the joint subassembly 31 above the level of the ground.

The use of a disc harrow or a spiral harrow in combination with the rigid link arm 29 provides for maintaining the path 102 of the harrow 33 parallel to the path, as 100, of the tractor drawing it.

In the operation the plow subassembly is equipped with both left and right-hand bottoms. In the path 100 of FIGURE 1 the plows 42 and 44 of tractor 21 in position 1B throw the soil to the right while the harrow subassembly 33 then concurrently treats the earth previously plowed. During the next, alternate, path 104 which is traversed by the tractor 21 in position 1C the left-hand plows 43 and 45 throw the soil to the left of the tractor; this movement of the earth is in the same absolute direction as the earth was moved during the path of travel 100; the disc harrow and spring harrow therebehind then moves over the earth treated by the plow during the path 106 traversed by the tractor 21 in position 1A and which path preceded that of path 100. Plowed swathes 100A, 100B and 100C are made by travel of tractor 21 in positions 106, 100 and 104, respectively.

The lateral position of the longitudinal axis of the harrow 33 relative to the path of travel of the tractor is determined in part by the angle which the teeth of the harrow make with the longitudinal axis of the harrow, as well as the weight of the weightbox on the harrow and the speed of the tractor and also by the angular relations maintained by joint 31 and arm 29.

Joint 31 maintains a fixed angular relationship between the longitudinal axis of arm 29 and the longitudinal axis of harrow 33 in the horizontal position of arm 25 while it permits a 180° variation in such angle to be accomplished in the relatively vertical position of arm 25 during turning, as shown in FIGURES 7 through 15.

The tension along the link arm 29 and boom 25 are applied to the frame of the plow subassembly to the rear of the point whereat the mouldboard plows as 44 and 45 meet the ground. Accordingly, in the preferred embodiment of this invention, the tensile force along said boom and arm is applied along a line which has a torque arm of about 1-foot length. This torque, counterclockwise in the position shown in FIGURE 3, serves to counter and oppose the clockwise torque provided by action of the earth on the mouldboards in the position shown in FIGURE 3. Accordingly, the use of the assembly of this invention provides for reducing the force on the landslide wheel as 68 and 69, also mounted on the platform 40.

A landslide wheel 68 is provided to engage the ground during the operation of the mouldboard plows 42 and 44 against the earth while a landslide wheel 69 is provided to contact the earth during operation of the mouldboard plows 43 and 45 on the ground.

Accordingly, the process and apparatus of this invention provides for reduction of the force of the landslide wheel and an improved transmission of the power of the tractor to treatment of earth to improve its infiltration by water and aeration and to provide a seedbed of even bulk density as well as avoid compaction of the earth along the line of contact of the landslide wheel with such earth.

The connection of the joint 31 and its plate 70 provide for a fixed angular relation of the length of the arm 29 and the longitudinal axis of the subassembly 33. This provides a fixed distance between the longitudinal axis of the tractor and the longitudinal axis of the harrow. Should the harrow, during its operation as in FIGURE 1 with the boom 25 in horizontal position as in FIGURE 1, attempt to move laterally the fixed relationship of the bar 29 and the longitudinal axis of the harrow and the "bite" of the harrow teeth on the ground, will result in that the harrow for any given condition of weight and of tractor speed will not move only laterally outwards or inwards to a translated position but also the longitudinal axis of the harrow will also rotate so that the harrow will return to operate at a distance predetermined from the longitudinal axis of the tractor. This control of the lateral distance of the path of the harrow from the path of the tractor is achieved by the fixing of the angular relations of the longitudinal axis of the harrow and the shaft 29 by the joint 31. By this invention the orientation of the harrow is fixed at any given speed of the tractor and loading of the harrow to provide a predetermined, constant reliable distance between the path of the plow and the path of the harrow and so provide for an evenness of soil-bed treatment not heretofore obtainable.

This improved result is obtained by a very simple, reliable equipment which does not require raising of the auxiliary ground-treating equipment as disc harrow 33 and spring harrow 95 off the ground as the desired orientation of the secondary equipment is obtained merely by translation of the harrow and any other earth-treating machine following therebehind and, thereafter, the firm yet rotatable connection provided by the device of this invention provides the evenness of soil treatment and a synergism of such secondary soil-treatment implements with the plow as has not heretofore been achieved.

According to this invention the subassembly 33 is moved from the right-hand position shown in FIGURE 3 to the left-hand position shown in FIGURE 4 on counterclockwise rotation of the boom 25. The boom is rotated counterclockwise as shown in FIGURE 7 from the position shown in FIGURE 2 while the subassembly 33 is still supported on the ground as shown in FIGURES 2 and 9. The link 29 then extends as shown in FIGURE 9 from the elevated joint 27 to the also elevated joint 31. Further continued rotation of the boom 25 to the position shown in FIGURES 10 and 12 moves the boom further to the left-hand position. Following this the boom is rotated to the position shown in FIGURES 13 and 4 and the subassembly 33 is still supported on the ground. Inasmuch as harrows, such as a spiral harrow or disc harrow, have a definite longitudinal direction through which they most freely move over the earth and through which they cut, the apparatus and process of this invention provides a simple and reliable method of controllably moving such supplementary earth seedbed-preparing devices in cooperation with the action of a two-way plow.

According to this invention the plows are not required to complete turning and pulverization of the soil, especially, lumpy soil produced by plowing of sod crops. This is because, according to this invention, the harrow cooperates with the plow not only to lessen the stress on the landslide wheel and reduce the undesirable compaction of the earth and improve the efficiency of the power effectively and beneficially applied to the soil but also, according to this invention, the harrow completes the pulverization and even turning which action is, therefore, not required to be accomplished by the plow alone. As shown in FIGURE 1, according to this invention, the pattern of tillage developed is shown by the tractor paths 100, 104, 106. When the tractor is turned about from the path 100, with plows 42 and 44 in engagement with the ground to the path 104, with the plows 43 and 45 in engagement with the ground, the harrow operates on the soil plowed previously without any additional operation on the part of the plow operator.

The path of the tractor, and plow subassembly and the path of the harrow subassembly 33 during a turn from travel in a first direction as along path 100 to travel in the opposite direction as along path 104 is diagrammatically shown in FIGURE 15. In this figure the path of the rotatable platform 40 of the tractor and plow subassembly is shown in the dashed line while the path of the harrow subassembly is shown by the dotted line during the successive positions of the component part as 40, 25, 29 and 33 shown as positions 120, 121, 122, 123, 124, 125, 126 and 127 in FIGURE 15. According to the process and apparatus of this invention the tractor and plow subassembly 23 and harrow subassembly 33 traverse separate curved paths. As shown in FIGURE 16, during the initial part of the turn boom 25 is rotated counterclockwise as shown in FIGURES 7, 8 and 10. This moving of the boom to the position shown in FIGURE 10 permits the harrow axis to then move freely with respect to the axis of the tractor.

The boom 25 is short enough, relative to arm 29 and height of the harrow 33 to permit that, in the vertical position of boom 25, as shown in FIGURE 10 the harrow subassembly may freely swivel about pivot pin 65 of joint 27: this permits the harrow subassembly to be moved from the left to the right (or vice versa) of the tractor while not providing such an elevation of the proximal end of arm 29 as to provide an undesirable degree of tilting of the frame 83 of harrow 33. Arm 25 is, however, long enough that the play in the link 27 is negligible and so avoids any tendency to lock during turning as illustrated in FIGURE 15.

Thus the harrow subassembly, as 33, always remains on the ground during turning. In turning to the left as shown in FIGURE 15, the harrow subassembly is initially located relative to the plow subassembly as shown at position 120, which corresponds to position 1B on FIGURE 1, on the right-hand side of the tractor 21. As the tractor begins to turn to the left the boom 25 is turned counterclockwise; the arm 29, in the vertical position of the boom 25 and yoke 60 may then swivel about boom 25 notwithstanding the fixed angular relation between the boom 29 and the longitudinal axis of the longitudinally extending drawbar arm 75 of the harrow 33; thereby the tractor and plow subassembly pass directly in front of the harrow 33 as shown at position 122. When the harrow is on the left-hand side of the tractor and with its longitudinal axis at less than 45° to the longitudinal axis 56 of the tractor, as at position 125, which occurs on further leftward turning and forward motion of the tractor, the boom 25 is rotated counterclockwise further from the position of FIGURE 10 through the position of FIGURE 13 and to the horizontal left-hand position shown in FIGURE 4. Thereafter, rightward turning of the tractor and plow subassembly moves the harrow subassembly 33 further, relatively, from the left-hand side of the tractor as shown at point 126 of FIGURE 15. Movement forward in a straight line by the tractor and plow subassembly 23, due to the reaction of the straight boom 29 and the fixed angle plate of joint 29 relative to the frame of subassembly 33 keeps the subassembly 33 a definite distance to the left-hand side of the tractor and plow subassembly as shown at position 127 of FIGURE 15 which corresponds to positions 1A and 1C in FIGURE 1 as above described.

It is within the scope of the invention that the angle at the joint 31 would be fixed by hydraulic means at any desired angle and so further control the lateral distance of the longitudinal axis of the harrow or other supplementary earth-treating machine relative to the path of the tractor and the plow or other primary earth-treating apparatus used therewith.

It is also within the scope of this invention that the torque arm distance from the point of engagement of the rearmost first ground-working tool as 43 to the line of tension through the longitudinal axis of the boom 25 may be made adjustable to increase (or decrease) the torque developed by the tension along arm 29 when it is desired to reduce (or increase, respectively) the pressure on the landslide wheel. For this purpose an elongated splined cylindrical shaft 130 may be firmly attached onto the rotatable platform 40 with its longitudinal axis coaxial with the axis of rotation of that platform: the boom is correspondingly fitted with a female splined groove to smoothly yet closely fit that shaft. The longitudinal position of the boom relative to the longitudinal axis of the spline shaft is fixed by pins which may be placed in any of several holes in the splined shaft. Also, this distance of the boom along the longitudinal shaft may be adjusted by hydraulic means, as a hydraulic piston operated from the power takeoff of the tractor. This is especially useful when soil of varied degrees of moisture consistency is met which varies the difficulty of the passage of the plowboard therethrough.

Although, in accordance with the provision of the patent statutes, a particular preferred embodiment of this invention has been described in detail and the principles of the invention have been described in the best mode in which it is now contemplated applying such principles, it will be understood that the construction and procedures shown and described are merely illustrative and that the invention is not limited thereto and, accordingly, alterations and modifications which readily suggest themselves to persons skilled in the art without departing from the true spirit of the disclosure hereinabove are intended to be included in the scope of the annexed claim.

I claim:

Process for concurrently treating earth mechanically with a two-way plow and a harrow comprising the steps of moving said plow, which is adapted for use in either of two operative positions, along a first direction in motion in a straight line along the longitudinal axis thereof, drawing behind and to one side of said plow a harrow comprising a plurality of earth treating elements with the axis of their engagement with the earth being parallel to each other, maintaining said harrow at a fixed distance from said plow by attachment of a rigid elongated spacing arm therebetween, fixing the angle of travel of said harrow relative to the axis of said spacing arm, and, positioning the harrow to travel in a path to one side of said plow and parallel to and at a fixed lateral distance from the line of direction of travel of said plow means during the said motion of said plow means along its longitudinal axis, and reversing the direction of motion of said plow and concurrently reversing the side of said plow on which said harrow is located while said harrow maintains contact with the ground.

References Cited by the Examiner

FOREIGN PATENTS 12,960  12/65  Germany.

References Cited by the Applicant

UNITED STATES PATENTS 1,239,599  9/17  Hicks.
1,276,843  8/18  Wentworth.
2,913,059  11/59  Toland et al.
3,087,556  4/63  Pursche.

ABRAHAM G. STONE, *Primary Examiner.*

T. GRAHAM CRAVER, *Examiner.*